Sept. 8, 1925.

H. A. STILSON

ANIMAL TRAP

Original Filed April 28, 1923    2 Sheets-Sheet 1

1,552,653

Inventor.
Herbert A. Stilson
By George E. Mueller Atty.

Sept. 8, 1925.

H. A. STILSON 1,552,653

ANIMAL TRAP

Original Filed April 28, 1923      2 Sheets-Sheet 2

Inventor:
Herbert A. Stilson
By: George E. Mueller
Atty.

Patented Sept. 8, 1925.

1,552,653

UNITED STATES PATENT OFFICE

HERBERT A. STILSON, OF CHICAGO, ILLINOIS.

ANIMAL TRAP.

Application filed April 28, 1923, Serial No. 635,353. Renewed December 8, 1924.

*To all whom it may concern:*

Be it known that I, HERBERT A. STILSON, citizen of the United States, residing at Chicago, in the county of Cook and State of Illinois, have invented a certain new and useful Improvement in Animal Traps, of which the following is a full, clear, concise, and exact description, reference being had to the accompanying drawings, forming a part of this specification.

My invention relates to animal traps of the type in which a jaw or arm is given an operative movement by a spring, and it is the principal object of my invention to provide a new and improved form and arrangement of parts by virtue of which the movement of the jaw shall be very rapid and very forcible at the end of its operative stroke, while at the same time the pressure on the bait arm for holding the arm in its set position may be exceedingly light. To this end, it is one of the objects of my invention to provide an improved system of links or levers for controlling and operating the jaw, and comprising a link which in the normal set position of the jaw stands approximately in dead center relation to the jaw member for holding it against the action of the spring, trigger regulated means being provided for controlling the position of the link with respect to the jaw member.

It is another object of my invention to provide a construction of this type which may be set easily and quickly by pressure applied by the foot of the operator without the necessity for bringing the hands into proximity to the spring pressed jaw. It is still another object of my invention to improve devices of this type in sundry details hereinafter pointed out. The preferred means by which I have accomplished my several objects is illustrated in the accompanying drawings, and is hereinafter specifically described. That which I believe to be new and desire to cover by Letters Patent is set forth in the claims.

In the drawings—

Figure 1:
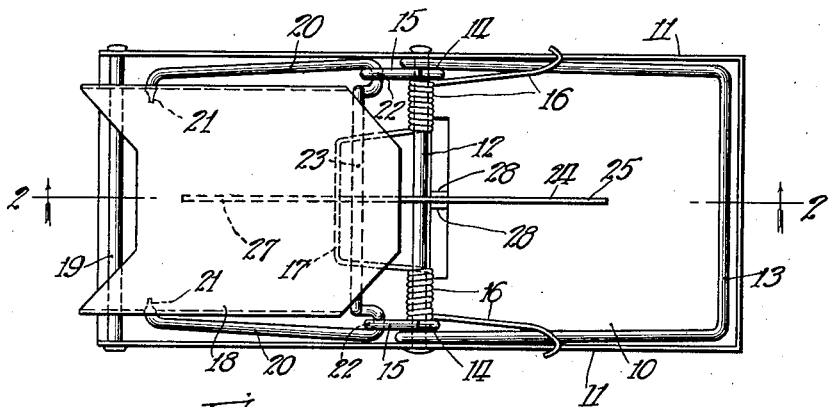
Fig. 1 is a top view of my improved trap.
Figure 2:
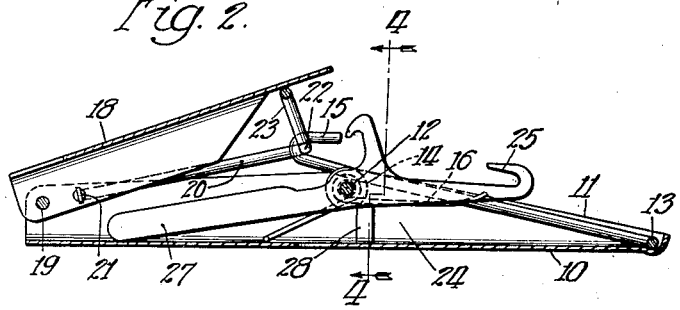
Fig. 2 is a longitudinal vertical section through the trap shown in Fig. 1, being substantially a section taken on line 2—2 of said figure.
Figure 3:
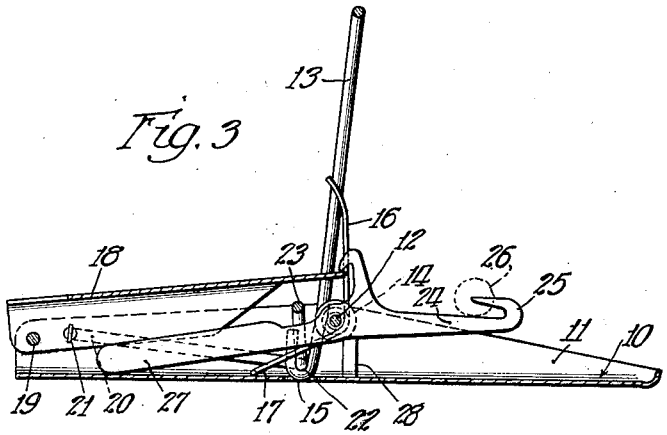
Fig. 3 is a view similar to Fig. 2, but showing the trap in set condition, ready for operation.
Figure 4:
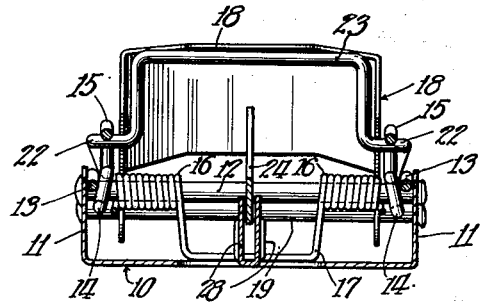
Fig. 4 is a transverse section taken on line 4—4 of Fig. 2.

Referring to Figs. 1 to 5, in which corresponding parts are indicated by the same reference characters; 10 indicates a base plate formed of sheet metal, reinforced and strengthened by side plates 11 formed integrally therewith. As is best shown in Fig. 1, a pin or bolt 12 is mounted transversely of the base in position between the side plates 11 of the base. A jaw 13 in the form of a yoke made of wire is pivotally mounted upon the pin 12 by means of loops 14, the ends of the wire of the jaw being extended beyond the loops to form arms 15 which are shown in the form of hooks. Coiled springs 16 are also mounted upon the pin 12 at opposite sides of the trap, the outer ends of the springs being extended to have bearings above the side arms of the jaw 13. In the construction shown, the two springs 16 are formed of a single length of wire, comprising an intermediate loop 17 by which the springs are afforded a purchase upon the base plate 10. The arrangement is such that the springs 16 tend to hold the jaw 13 yieldingly in its lowered position, as shown in Fig. 2, with the arms 15 of the jaw member extending rearwardly from the pivot pin 12. The strength of the springs 16 is such that when the jaw is released from its raised position, as shown in Fig. 3, it is given by the springs a very rapid and a very forcible stroke downwardly into contact with the base plate 10 at the forward end of the trap.

A foot lever 18, also formed of sheet metal, in the construction shown, is pivotally mounted upon a pin 19 at the rear end of the base. A link 20, in the form of a yoke, is pivotally connected with the sides of the foot lever 18 by means of turned ends 21. As is best shown in Fig. 1, this link comprises transversely extending bearing portions 22 which engage the hooked arms 15 of the jaw member, a raised offset portion 23 between the bearing portions 22 serving to provide a support for the forward end of the foot lever 18 when the jaw is in its lowered position. It will be understood from an inspection of Fig. 2, that when downward pressure is applied upon the foot lever 18, with the parts in the position as shown in Fig. 2, the foot lever 18 and the link 20 are adapted to swing downwardly together, serving by the engagement of the link 20 with the jaw member 13 to force the arms 15 downwardly and the jaw upwardly against the action of the springs 16, the link 20 being adapted to slide along the arms 15 toward the pivot pin 12, as may be necessary.

The arrangement in the construction shown is such that when the link 20 is moved downwardly to the limit of its motion, as controlled by the hooked arms 15, the arms of the link 20 are brought into substantially perpendicular position with respect to the jaw member 13, that is to say, with respect to the arms 15 with which contact is maintained. In the construction shown, the arrangement is such that when the rear end of the link 20 is held in its lowered position, as shown in Fig. 3, the angle between the link 20 and the arms 15 of the jaw member is so nearly a right angle that the link is enabled to hold the jaw in its raised position against the pressure of the springs 16. That is to say, in the construction illustrated, the angle is so nearly a right angle that the friction between the link 20 and the arms 15 is sufficient to hold the link against sliding along the arms 15 toward the pivot pin 12. For holding the foot lever 18 in its lowered position, I have provided a trigger 24 mounted upon the pin 12 in position to engage the forward end of the lever 18 for limiting the upward movement of such lever. As is shown in Fig. 3, with the link 20 lowered to its operative position, the springs 16, acting through the arms 15 and the link 20, have a very slight tendency to raise the foot lever 18 by reason of the fact that the axis of the pivotal connection between the link 20 and the foot lever 18 is very slightly above the line between the center of the pin 19 and the point where the link 20 engages the jaw member. That is to say, the rear or pivotal end of the link 20 is almost, but not quite, in the dead center position between the axis 19 of the foot lever 18 and the point of engagement of the link with the jaw member. As a result of this very small component of the force of the springs 16 acting in an upward direction upon the foot lever 18, the foot lever is raised out of contact with the support 23 of the link, the link itself being kept from likewise rising, by its frictional engagement with the jaw member, as above explained.

In the construction shown, the trigger 24 is formed of sheet metal comprising a hook 25 on its forward end for receiving the bait indicated in dotted lines by the numeral 26. The trigger also comprises a plate 27 at its rear end, designed to be of such a size as to hold the bait arm 25 in raised position by gravity, as is clearly shown in Fig. 2.

For holding the trigger 24 more firmly in position, lugs 28 are struck up from the base plate 10 on opposite sides of the trigger, as is best shown in Fig. 1.

With the trap set, in the condition shown in Fig. 3, the only force held in restraint by the trigger 24 is that component of the entire force of the springs 16 tending to move the rear end 21 of the link 20 upwardly, that is to say, in the direction substantially at right angles with respect to the link 20. By reason of the fact that the distance between the point where the trigger 24 engages the foot lever 18 and the axis 21 upon which the link 20 is connected with the foot lever is several times greater than the distance between the axis of the link 20 and the axis 19 of the foot lever 18, this small component of the entire force of the springs 16 acting at the axis of the link 20 is quite materially reduced at the forward end of the foot lever. It is thus clear that the upward tension upon the trigger 24 is very small indeed, from which it follows that the force required for releasing the trigger 24 is likewise very small.

In operation, when the trigger 24 is moved out of engagement with the front end of the foot lever 18, the force of the springs 16, acting through the arms 15 and the link 20, serves to move the axis of the link 20 upwardly and toward the left in Fig. 3, thus giving to the link 20 a very slight movement longitudinally of itself toward the left in said figures. As a result of this longitudinal movement of the link 20, the jaw 13 is permitted to move very slightly in clockwise direction in Fig. 3, serving to increase the size of the angle between the link 20 and the arms 15. The arrangement is such, in the construction shown, that when the angle between the link 20 and the arms 15 has been increased to a very slight degree, from the position as illustrated in Fig. 3, the sliding friction of rest is overcome and the link 20 is displaced upwardly so as to permit a very sudden and a very forcible final portion of the stroke of the jaw 13 into contact with the base plate 10.

Figure 6:
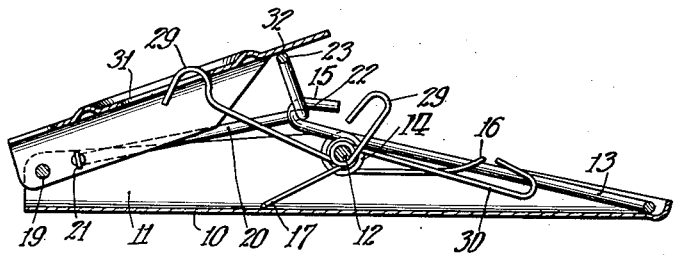
Fig. 6 is a view similar to Fig. 2, but showing a modified form of construction.
Figure 5:
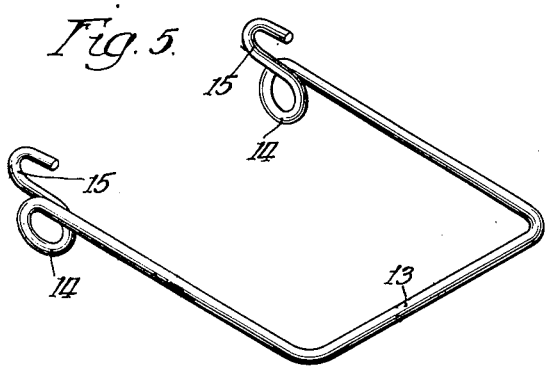
Fig. 5 is a perspective view of the jaw member.

Referring now to Fig. 6, in which also corresponding parts are indicated by the same reference numerals as those already applied, a trigger 29 formed of wire is used in lieu of the trigger 24. As is shown in said Fig. 6, the trigger 29 is so proportioned and arranged that it stands normally in position with the bait arm 30 in lowered position, rather than in its raised position. For moving the trigger into operative position when the link 20 is lowered for raising the jaw member 13, I have arranged the rear end portion of the trigger in position to extend upwardly a short distance through an opening 31 in the foot lever 32 in such a manner that the foot of the operator serves to raise the forward end of the trigger at the same time that the jaw 13 is raised. In this manner, the trigger is brought into operative position so as to have operative engagement with the forward end of the foot lever 32, as will be readily understood.

While I prefer to employ the form of device illustrated in the drawings, it will be understood that I do not wish to be restricted to such detailed form of construction except as the same may be hereinafter specifically claimed; inasmuch as it is evident that many changes may be made in the details of construction without departing from the spirit of the invention.

What I claim as new and desire to secure by United States Letters Patent is:

1. An animal trap, comprising a base, a spring controlled jaw pivotally mounted on said base and provided with a jaw end and setting end, a foot-plate pivoted to said base, a link pivotally connecting the foot-plate and setting end of the jaw whereby when the foot-plate is depressed the link elevates the jaw end to a set position, a trigger for holding the link and thereby the jaw in set position, and a bait extension for the trigger for operating the same to release the link and permit the jaw to close on the base.

2. An animal trap, comprising a base, a spring controlled jaw pivotally mounted on said base and provided with a jaw end and setting end, a foot-plate pivoted to said base, a link pivotally connecting the foot-plate and setting end of the jaw whereby when the foot-plate is depressed the link elevates the jaw end to a set position, a trigger engaged by the foot-plate when depressed to hold the jaw set through the medium of the link, the connection from the plate to the jaw being such that the spring pressure on the jaw communicated to the trigger is modified to permit an easy release thereof.

3. An animal trap, comprising a base, a spring controlled jaw pivotally mounted on said base and provided with a jaw end and setting end, a foot-plate pivoted to said base, a link pivotally connecting the foot-plate and setting end of the jaw whereby when the foot-plate is depressed the link elevates the jaw end to a set position, a trigger engaged by the foot-plate when depressed to hold the jaw set through the medium of the link, the pivotal connection between the link and plate being slightly off a line from the plate pivot to the connection between the link and setting end of the jaw, whereby the spring pressure on the jaw communicated to the trigger is reduced to permit an easy release thereof.

4. An animal trap, comprising a base, a spring controlled jaw pivotally mounted on said base and provided with a jaw end and setting end, a foot-plate pivoted to said base, a link pivotally connecting the foot-plate and setting end of the jaw whereby when the foot-plate is depressed the link elevates the jaw end to a set position by unmodified action of the foot-plate on the setting end, a trigger engaged by the foot-plate when depressed to hold the jaw set through the medium of the link, the connection from the plate to the jaw being such that the spring pressure on the jaw communicated to the trigger is modified to permit an easy release thereof.

5. An animal trap, comprising a base, a spring controlled jaw pivotally mounted on said base and provided with a jaw end and setting end, a foot-plate pivoted to said base, a link pivotally connecting the foot-plate and setting end of the jaw whereby when the foot-plate is depressed the link elevates the jaw end to a set position, a trigger engaged by the foot-plate when depressed to hold the jaw set through the medium of the link, the link being connected with the jaw by a sliding pivotal connection whereby upon operation of the trigger to release the foot-plate and thereby the jaw, the initial release movement of the plate and jaw is effected through a pivotal movement of the sliding pivotal connection and the release movement of the jaw continued through the sliding connection.

6. In a device of the class named, embodying a sheet metal base-plate and spring-jaw supported thereon; a foot-plate, pivotally supported on said base-plate, and adapted to engage said jaw, to open the same; a transversely extending shaft for pivotally supporting the spring jaw on the ends of the shaft leaving a substantial uncovered space in the center of the shaft, a sheet-metal bait lever, pivotally supported in the center of the shaft by a bearing comprising a hole punched through the flat lever, and provided with means for engaging said foot-plate; a pair of lugs punched up out of the base plate, one each side of the lever, for holding the lever in fixed position on the uncovered space of the shaft, and a weighted end for the bait-lever to move the latter to engage and hold the foot-plate when operated to set the trap.

In witness whereof, I hereunto subscribe my name this 24th day of March A. D., 1923.

HERBERT A. STILSON.